Oct. 7, 1958 — O. E. GRIMSBO — 2,855,125
SEED PLANTER
Filed Aug. 23, 1955 — 2 Sheets-Sheet 1
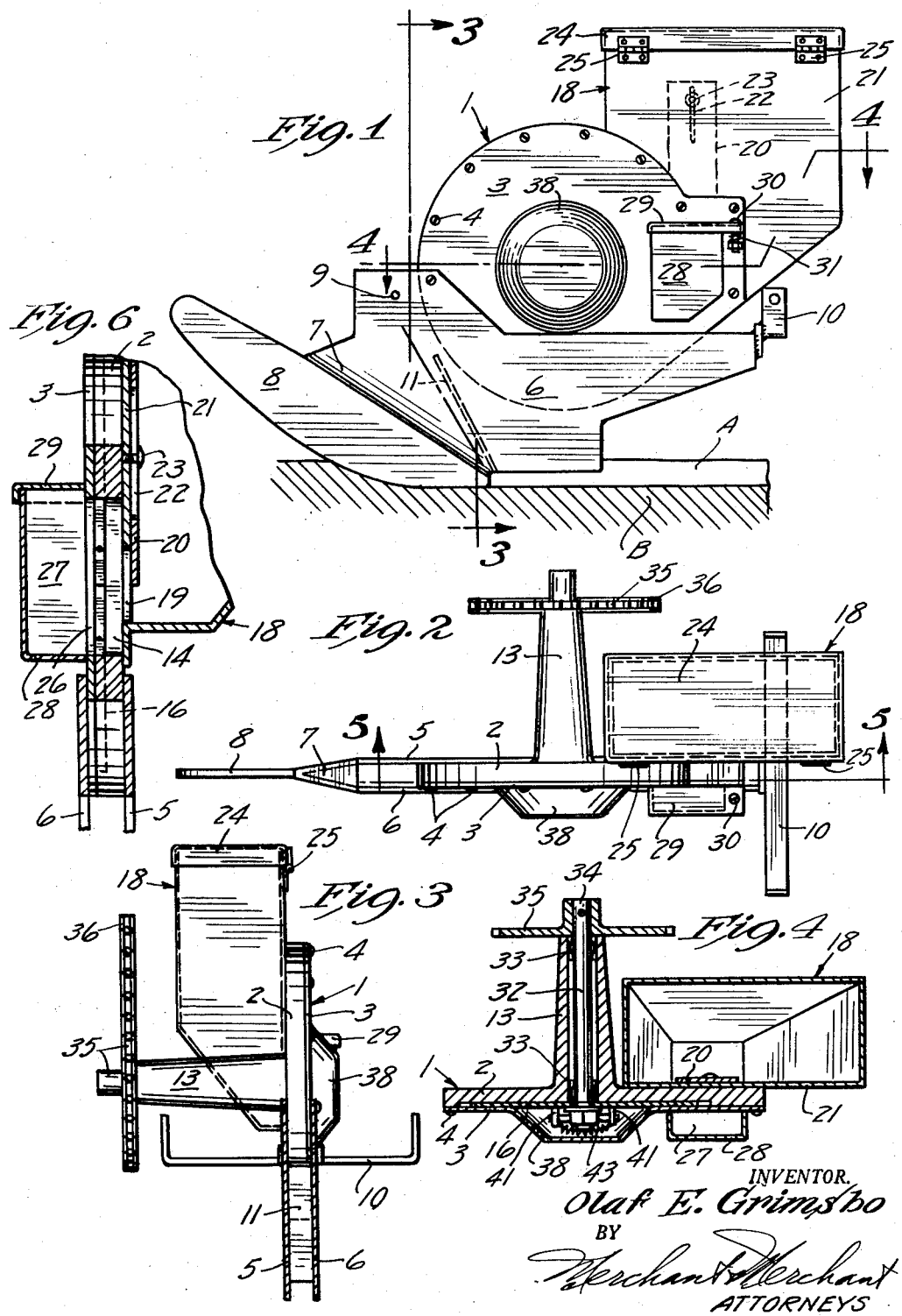
INVENTOR.
Olaf E. Grimsbo
BY Merchant & Merchant
ATTORNEYS Oct. 7, 1958     O. E. GRIMSBO     2,855,125
SEED PLANTER
Filed Aug. 23, 1955     2 Sheets-Sheet 2
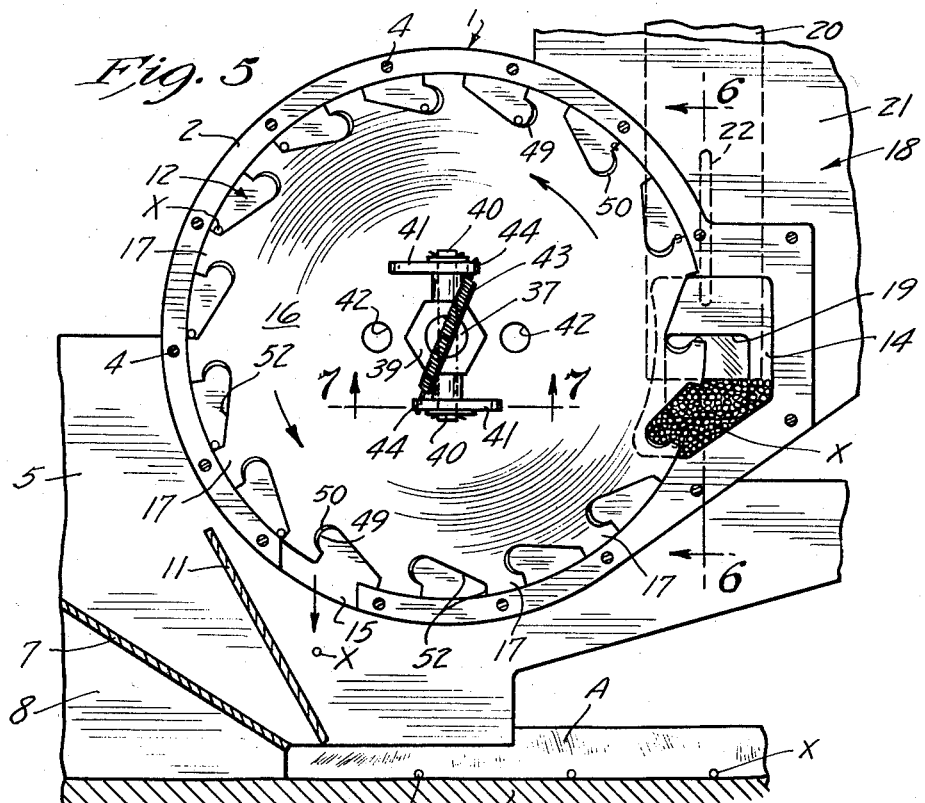
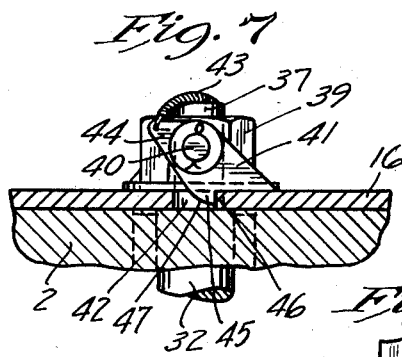
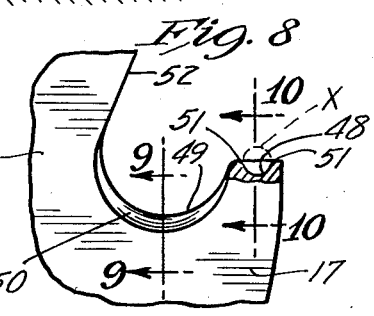
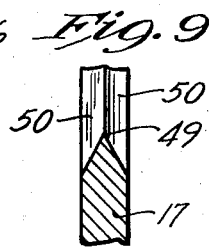
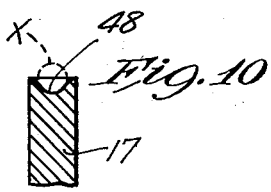
INVENTOR.
Olaf E. Grimsbo
BY
Merchant & Merchant
ATTORNEYS

United States Patent Office 2,855,125
Patented Oct. 7, 1958

2,855,125

SEED PLANTER

Olaf E. Grimsbo, Grand Rapids, Minn.

Application August 23, 1955, Serial No. 530,125

1 Claim. (Cl. 221—266)

My invention relates generally to seed planters and more particularly to improvements in planters utilizing seed feeding wheels.

An important object of my invention is the provision of a seed wheel which will feed seeds from a supply hopper in a uniform manner and which dispenses with the necessity for special ejecting devices.

Another object of my invention is the provision of a seed wheel which picks up and transports only the required number of seeds from the supply thereof per revolution of the wheel, and which automatically rejects all but said required number.

A still further object of my invention is the provision of a seed planter as set forth which may be quickly and easily emptied of seeds remaining therein when planting of an area has been completed.

Still another object of my invention is the provision of a seed planter of the above type which is simple and inexpensive to manufacture, which is highly efficient in operation, and which is rugged in construction and durable in use.

The above and still further highly important objects and advantages of my invention will become apparent from the following detailed specification, appended claim and attached drawings.

Referring to the drawings, which illustrate the invention, and in which the like characters indicate like parts throughout the several views.

Fig. 1 is a view in side elevation of a seed planting device built in accordance with my invention;

Fig. 2 is a view in plan of the seed planter of Fig. 1.

Fig. 3 is a view partly in front elevation and partly in section taken substantially on the line 3—3 of Fig. 1;

Fig. 4 is a horizontal section taken substantially on the line 4—4 of Fig. 1;

Fig. 5 is an enlarged fragmentary view partly in side elevation and partly in section, taken on the line 5—5 of Fig. 2;

Fig. 6 is a fragmentary detail in vertical section taken on the line 6—6 of Fig. 5;

Fig. 7 is a still further enlarged fragmentary detail in section taken substantially on the line 7—7 of Fig. 5;

Fig. 8 is a greatly enlarged fragmentary view in side elevation of one of the feeding teeth of the seed wheel of my invention, some parts being broken away and some parts shown in section;

Fig. 9 is a fragmentary detail in section taken on the line 9—9 of Fig. 8; and

Fig. 10 is a fragmentary section taken substantially on the line 10—10 of Fig. 8.

Referring with greater detail to the drawings, the numeral 1 indicates in its entirety a casing structure comprising a main casing element 2 and a cover plate element 3 secured to the main casing element 2 by means of spaced screws or the like 4. The casing structure 1 is mounted between a pair of laterally spaced vertically disposed side plates 5 and 6 which taper toward each other at their front ends as indicated at 7. A furrowing blade 8 is welded or otherwise secured to the lower front end tapering portions 7 and cooperates with the side plates 5 and 6 to plow a furrow A in the earth, indicated at B in Figs. 1 and 5. The side plates 5 and 6 are provided at their front end portions with aligned apertures 9, and at their rear ends with an apertured mounting bracket 10 by means of which the structure may be mounted to a tractor or the like for movement through a field. A forwardly inclined guide plate 11 extends transversely between the side plates 5 and 6 in underlying relation to a portion of the casing structure 1, for a purpose which will hereinafter be described.

The casing structure elements 2 and 3 cooperate to define a generally cylindrical chamber 12, the casing element 2 having a horizontally disposed bearing boss 13 projecting outwardly from one side thereof in axial alignment with the chamber 12. The casing sections 2 and 3 further define an inlet chamber 14 which opens radially outwardly from the cylinder 12 adjacent the horizontal level of the axis of the chamber, and an outlet 15 at the bottom portion of the casing structure in overlying relationship to a portion of the guide plate 11, see particularly Fig. 5.

Mounted for rotation within the feed chamber 12 is a seed wheel 16 which has a diameter only sufficiently smaller than that of the chamber 12 to provide running clearance therebetween. The seed wheel 16 has relatively flat opposite sides which slidably engage the adjacent end walls of the chamber 12, and is formed to provide a plurality of hook-like teeth 17 which define circumferentially spaced seed receiving and dispensing recesses therebetween. Upon rotation of the seed wheel 16, the teeth 17 thereof successively enter the inlet chamber 14 to pick up a seed therein, subsequently dropping the seeds through the outlet 15 onto the guide plate 11, from whence the seeds are dropped to the bottom of the furrow A, see Fig. 5.

Seeds are fed to the inlet chamber 14 by gravity from a supply hopper 18 having a discharge opening 19 at one side and adjacent the bottom thereof, said discharge opening communicating with the inlet chamber 14. A slide valve plate 20 is slidably mounted on a wall 21 of the hopper 18 for opening and closing movements with respect to the discharge opening 19. The valve plate 20 is provided with a pair of aligned slots 22 through which extend anchoring screws or the like 23 which hold the valve plate 20 in frictional engagement with the adjacent wall 21 of the hopper in the desired set position to regulate the flow of seeds X to the inlet chamber 14. The hopper 18 is open-topped and is provided with a closure 24 hinged to the wall 21 as indicated at 25. The casing element 3, which overlies one side of the inlet chamber 14, is provided with an opening which communicates with the inlet chamber 14 and with an overflow chamber 27 defined by an open-topped box-like structure 28 welded or otherwise rigidly secured to the casing element 3. The structure 28 is provided with a closure element 29 that is mounted for pivotal movements toward and away from an operative closed position by means of a pivot bolt or the like 30. A coil compression spring 31 is utilized to impart sufficient friction to the closure member 29 to prevent the same from being accidentally opened during operation of the machine.

The seed wheel 16 is provided with a central aperture which loosely receives one end of a drive shaft 32 that is journaled in axially spaced bearings 33 at opposite ends of the horizontally disposed bearing boss 13. The extreme outer end 34 of the drive shaft 32 projects axially outwardly from the boss 13 and has rigidly secured thereto a drive sprocket or the like 35 which is adapted to be connected, by means of a drive chain 36, to a suitable source of power such as a motor or the like, not shown, whereby to cause the shaft 32 to be driven in a counterclockwise direction with respect to Fig. 5. The inner end portion 37 of the shaft 32 projects into a central recess defined by the central portion of the seed plate 16 and an outwardly-dished portion 38 of the casing element 3, and has secured thereto a head in the nature of a nut 39. A shaft 40 extends transversely through the head or nut 39 and the end portion 37 of the shaft 32 and has journalled on its opposite end portions a pair of drive teeth 41 that are each adapted to engage one of a plurailty of circumferentially spaced apertures 42 extending transversely through the seed plate 16, see Figs. 5 and 7. A coil tension spring 43 extends over the end of the shaft portion 37, and has its opposite ends secured to radially projecting lugs 44 on the drive teeth 41, whereby to yieldingly urge the drive teeth 41 toward the adjacent side of the seed wheel 16. The above-described mechanism comprises a relatively simple form of overrunning clutch by means of which the seed plate 16 is driven in a counterclockwise direction with respect to Fig. 5 when the shaft 32 is driven in this direction, but in which the seed plate 16 will remain stationary when the shaft 32 is rotated in a clockwise direction with respect to Fig. 5. As shown in Fig. 7, the drive teeth 41 are each provided with a depending element 45 which is adapted to enter an aperture 42 and which is provided with a vertically disposed driving surface 46 which engages the wall of the aperture 42 to drive the seed wheel 16. The element 45 has an upwardly sloping rear wall surface 47 which is engageable with the wall of its respective aperture 42 upon rotation of the shaft 32 in the opposite direction to cause the depending element 45 to be cammed out of the aperture 42. When this occurs, the seed wheel 16 will remain stationary.

The seed receiving and dispensing recesses are each defined by the hook-like feeding teeth 17, which are adjacent their peripheral portions, each provided on the trailing surface 51 with a seed-receiving pocket 48 which opens in the direction of rotation of the seed wheel 16. Each tooth 17 is formed to provide a concave arcuate edge 49 radially inwardly of the pocket 48. As shown particularly in Fig. 9, the opposite sides of each tooth 17 adjacent the arcuate edge 49 thereof converge toward the arcuate edge 49 as indicated at 50. The seed pockets 48 are of a size to loosely receive a single seed X, the portion of each tooth around the pocket 48 presenting a surface of insufficient size to permit a seed X to rest thereon. Thus, when each tooth 17 moves upwardly through the inlet chamber 14, and through the seeds X contained therein, but a single seed X will lodge in the pocket 48 of the tooth and be removed thereby from the inlet chamber 14. The angular relationship of the tapering portions 50 to their adjacent sides of the teeth 17 is such that seeds cannot lodge therein. Obviously, the arcuate edge 49, being relatively sharp, will not support seeds during rotation of the seed wheel 16. Therefore, with my novel tooth construction as above described, each tooth 17 is able to remove but a single seed from the inlet chamber 14 during a single passage therethrough.

With reference particularly to Fig. 5, it will be noted that the arcuate edge 49 of each tooth 17 tangentially joins the leading surface of the respective recess. The leading surfaces, indicated at 52, are flat transversely of the seed wheel 16 so that, as each tooth progresses from the inlet chamber 14 to the outlet 15, the seeds X carried in the pockets 48 will drop therefrom to the flat leading surfaces of a respective recess, and drop downwardly through the outlet 15 when its respective preceding tooth passes thereover. The released seeds X strike the guide plate 11 and move downwardly thereon by gravity, coming to rest at the bottom of the furrow A in a uniform spaced relationship longitudinally of the furrow A.

In the event that the sprocket wheel 35 is operatively coupled to one of the ground-engaging whels of an agricultural implement, not shown, to be driven thereby, and rotation of said ground wheel is reversed, the overrunning clutch arrangement comprising the driving teeth 41 and apertures 42 will prevent rotation of the seed wheel 16 in a clockwise direction with respect to Fig. 5. Obviously, if the seed wheel 16 were permitted to rotate in such clockwise direction, a substantial number of seeds X would be transferred from the inlet chamber 14 to the outlet 15 and be thus wasted. Opening of the closure elements 24 and 39 of the hopper 18 and overthrow chamber 27 respectively, permits the machine to be quickly emptied of unplanted seeds at the end of the seeding operation.

My invention has been thoroughly tested and found to be completely satisfactory for the accomplishment of the objectives set forth; and while I have shown and described a preferred embodiment of my novel seed planter, it will be understood that the same is capable of modification without departure from the spirit and scope of the invention as defined in the claim.

What I claim is:

In a seed planter, casing structure defining an enclosed cylindrical chamber, an inlet and an outlet, said inlet and outlet being in communication with said chamber and disposed in spaced relationship to each other circumferentially of said chamber, a seed hopper having a discharge opening communicating with said inlet, and a disc-type seed wheel journalled for rotation in and substantially filling said chamber, said seed wheel having a plurality of radially outwardly opening circumferentially spaced seed receiving and dispensing recesses in the peripheral portion thereof, means preventing rotation of said wheel in one direction and permitting rotation thereof in the other direction to bring each of said recesses alternately into registration with said inlet and outlet openings, each of said recesses being defined by a substantially radially disposed trailing surface adjacent the periphery of said seed wheel, an arcuate surface disposed radially inwardly from said trailing surface, a leading surface, and an intermediate surface connecting said arcuate surface and said leading surface, each of said trailing surfaces having a seed-receiving pocket formed therein opening circumferentially forwardly in the direction of rotation of said seed wheel, the marginal surface portion of said trailing surfaces adjacent the respective pockets being of insufficient size and contour to support a seed, the arcuate surface of each recess extending generally radially inwardly and rearwardly, with respect to the direction of rotation of said seed wheel, from the respective radial trailing surface with the axially opposed side portions thereof converging toward each other to define an insufficient area, in an axial plane, to support a seed thereon, the intermediate surface of each recess being substantially transversely flat adjacent the leading surface thereof to facilitate movement of a seed from the trailing surface thereof to said leading surface and the discharge of such seed through the outlet upon movement of each leading surface into registration with the outlet.

References Cited in the file of this patent

UNITED STATES PATENTS

| | | |
|---|---|---|
| 1,129,338 | Davis | Feb. 23, 1915 |
| 1,161,369 | Ayers | Nov. 23, 1915 |
| 1,879,055 | Boykin | Sept. 27, 1932 |
| 2,667,286 | Raught | Jan. 26, 1954 |